United States Patent [19]
Martin

[11] Patent Number: 4,786,480
[45] Date of Patent: Nov. 22, 1988

[54] TWO-PART FLUID CONTACTOR

[75] Inventor: Peter D. Martin, Abingdon, England

[73] Assignee: United Kingdom Atomic Energy Authority, London, England

[21] Appl. No.: 899,633

[22] Filed: Aug. 25, 1986

[30] Foreign Application Priority Data

Aug. 30, 1985 [GB] United Kingdom ............... 8521629

[51] Int. Cl.$^4$ ............................................. B04B 1/06
[52] U.S. Cl. ................................. 422/259; 366/241; 366/290; 366/349; 494/31; 494/44
[58] Field of Search ................... 422/257, 258, 259; 366/241, 279, 290, 349; 494/31, 44

[56] References Cited

U.S. PATENT DOCUMENTS

| | | | |
|---|---|---|---|
| 2,622,796 | 12/1952 | Steinacker et al. | |
| 2,715,994 | 8/1955 | Steinacker | |
| 2,776,305 | 1/1957 | Habicht | 422/259 |
| 2,779,537 | 1/1957 | Madany | 422/258 |
| 2,941,871 | 6/1960 | Geller et al. | 422/258 |
| 3,374,988 | 3/1968 | Eckert | 422/258 |
| 3,719,455 | 5/1971 | Ohono et al. | 422/259 |

FOREIGN PATENT DOCUMENTS

| | | |
|---|---|---|
| 585517 | 9/1933 | Fed. Rep. of Germany ...... 422/257 |
| 1044034 | 11/1958 | Fed. Rep. of Germany . |
| 2540133 | 3/1977 | Fed. Rep. of Germany . |
| 769254 | 8/1934 | France . |
| E-93460 | 4/1969 | France . |
| 0108684 | 5/1984 | PCT Int'l Appl. . |
| 632375 | 11/1978 | U.S.S.R. ............................ 422/258 |
| 414558 | 8/1934 | United Kingdom . |
| 1157361 | 7/1969 | United Kingdom . |

*Primary Examiner*—Barry S. Richman
*Assistant Examiner*—Timothy M. McMahon
*Attorney, Agent, or Firm*—Larson and Taylor

[57] ABSTRACT

Present invention relates to two-part fluid contactors for application in fluid-fluid contacting processes such as liquid-liquid extraction processes used in nuclear fuel reprocessing. The contactor has a first part and a second part with a plurality of annular regions located between the first and second parts and a plurality of settling compartments disposed sequentially along the axis of rotation of the contactor. First and second fluids are introduced into the annular regions, and a mixture of the first and second fluids is transferred into the settling compartments. The first and second fluids substantially separate in the settling compartments and are then removed therefrom. The apparatus is arranged such that in operation the first and second parts may be moved relatively to one another so that conditions exist in the annular regions such that the first and second fluids disperse one within the other to form a mixture of fluids.

4 Claims, 7 Drawing Sheets

TWO-PART FLUID CONTACTOR

The present invention relates to contactors and in particular to centrifugal contactors which find application in fluid-fluid contacting processes (e.g. liquid-liquid extraction processes, for example those used in nuclear fuel reprocessing).

According to one aspect of the present invention there is provided a centrifugal contactor comprising a first part and a second part having a plurality of annular regions between the first part and the second part, a plurality of settling compartments in one of the parts, means for introducing a first fluid and a second fluid into the annular regions, means for transferring a mixture of the first fluid and the second fluid to the settling compartments and means for removing substantially separated first fluid and second fluid from the settling compartments, the arrangement being such that, in operation, the first part and the second part may be moved relatively one to the other so that conditions exist in the annular regions such that the first fluid and the second fluid disperse one within the other to form a mixture of fluids.

In one embodiment of the present invention there is provided a centrifugal contactor comprising a first part and a second part having a plurality of annular regions between the first part and the second part, a plurality of settling compartments in one of the parts, means for introducing a first phase and a second phase into the annular regions, means for transferring a mixture of the first phase and the second phase to the settling compartments and means for removing substantially separated first phase and second phase from the settling compartments, the arrangement being such that, in operation, the first part and the second part may be moved relatively one to the other so that conditions exist in the annular regions such that the first phase and the second phase disperse one within the other to form a mixture of phases.

In a preferred embodiment of the present invention the first part is a stator and the second part is a rotor positioned within the stator.

The settling compartments are preferably provided in the rotor.

It is also preferred that the means for removing substantially separated first and second phase from the settling compartment are such that the first phase and the second phase may pass in counter-current flow into further annular regions.

Thus, it will be appreciated, that a first fluid phase may pass in a first direction from a given settling compartment into another annular region wherein it may encounter second fluid phase and second fluid phase may pass from the given separating compartment in a second direction in counter-flow to the first fluid phase into a further annular region wherein it may be mixed with first fluid phase.

In an embodiment of the present invention a rotor may provide a plurality of settling zones and ports, apertures and ducts for the transfer of a first phase and second phase and/or a mixture of the first phase and the second phase.

The rotor and stator may be so designed and shaped as to define the plurality of annular regions.

Alternatively the stator can be provided with a liner (e.g. of stainless steel) so shaped as to define in combination with the rotor the plurality of annular regions. The liner may be made of thin sheet metal (e.g. stainless steel). Also the liner may be such that it can be separated from the stator and replaced by a new liner if desired.

Seals are provided as required between the stator and rotor to separate successive annular regions. These may be rotating seals as necessary. In the case of using a liner the use of rotating seals may be avoided and the use of static seals between liner and the stator may be used.

It is to be understood that due to the relative motion of the first and second parts high shear conditions can be made to exist in the annular regions in operation such that the first phase and the second phase can disperse one within the other to form a mixture of phases.

Also it will be understood that where the first and second parts are respectively a stator and a rotor and the settling compartments are provided in the rotor, a mixture of phases may be passed into the settling compartments and disengagement of the phases may occur therein under the influence of centrifugal force imparted by the rotor. (The disengagement may be substantially complete).

The present invention may be used substantially to avoid or reduce the disadvantages of certain types of known centrifugal contactors.

For example, one known type of contactor is a single stage device and this suffers from the disadvantage that a plurality of single stage devices must be provided in order to carry out a multi-stage contacting process. The present invention provides a plurality of contacting and separating regions in one contactor.

In a further type of known contactor multi-stages are provided but there is the tendency to block if solids are present in phases fed through the device and the construction is complicated and difficult to dismantle because of the use of interlocking parts.

A contactor in accordance with the present invention may be constructed with a rotor and stator shaped such that they can be separated simply.

A contactor in accordance with the present invention may, for example, be used in liquid-liquid solvent extraction processes in which an organic phase is contacted with an aqueous phase. An example of such a process is in nuclear fuel processing.

In embodiments of the present invention wherein a rotor is provided within a stator, the stator thereby providing a casing for the rotor, and settling compartments are provided in the rotor it will be appreciated that the mixing regions of the contactor are outside of the settling compartments.

The invention will now be further described by way of example only with reference to the accompanying drawings in which.

Figure 1:
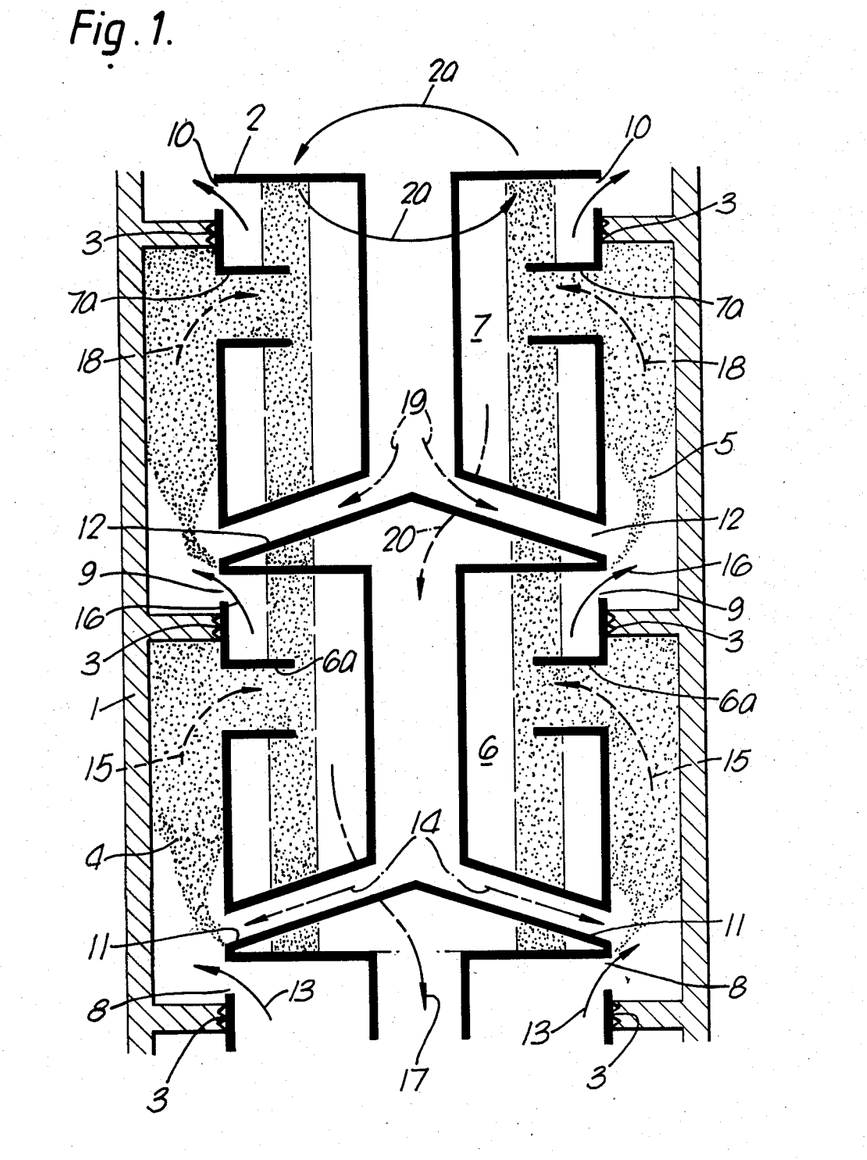
FIG. 1 is a diagrammatic representation of a portion of a contactor in accordance with the invention.

Referring now to FIG. 1 of the drawings there is shown, for the purposes of describing the principle of operation of one form of contactor in accordance with the present invention, a diagrammatic representation of a portion of a contactor.

The contactor has a substantially circular cylindrical stator 1 and a substantially right circular cross-section rotor 2 within the stator 1. It will be appreciated that the stator 1 provides a casing for containing rotor 2.

Rotating seals 3 are provided between the stator 1 and the rotor 2 and the stator 1 and the rotor 2 are so shaped as to define annular regions 4 and 5.

The rotor 2 is provided with settling compartments 6 and 7 and ports 6a, 7a, 8, 9, 10, 11 and 12.

The ports 8, 9 and 10 are arranged to permit the passage of a first fluid phase when the contactor is in operation. Similarly ports 11 and 12 are arranged for the passage of a second fluid phase when the contactor is in operation. Ports 6a and 7a are arranged to permit the passage of a mixture of a first and second fluid phase when the contactor is in operation. The ports 6a and 7a act, in operation, as weir tubes and the length thereof can be chosen to determine the position of mixed first and second phases in the settling compartments 6 and 7 when the contactor is in operation.

In operation the rotor 2 is rotated within the stator 1, as indicated by the arrows 2a, and a first fluid phase is passed through ports 8 into annular region 4 as indicated by the solid arrows 13 and a second fluid phase is passed through ports 11 into the annular region 4 (as indicated by the light arrows 14). Due to the relative rotation of the stator 1 and the rotor 2 high shear conditions occur in the annular region 4 such that mixing of the first and second fluid phases occurs to give a mixed fluid phase, comprising a mixture of the first and second phases, indicated by the dotted portion in the region 4.

The mixed-fluid phase passes, by way of ports 6a as shown by arrows 15, into the settling compartment 6 wherein disengagement (which may be substantially complete disengagement under the appropriate conditions) of the first and second fluid phases occurs under the influence of centrifugal force imparted by rotation of the rotor 2. One fluid phase (the heavier of the two fluid phases) passes through ports 9 into annular region 5 as indicated by the solid arrows 16 and the other fluid phase (i.e. the lighter of the two fluid phases) passes downwardly out of the settling compartment 6 as indicated by the light arrow 17.

The fluid phase which passes into annular region 5 (i.e. the heavier phase) is mixed with the fluid phase passing into the annular region 5 (i.e. the lighter phase) through the ports 12 as shown by the arrows 19. By means of high shear conditions existing in the annular region 5 a mixed fluid phase is formed as indicated by the dotted portion in region 5.

The mixed fluid phase passes, through ports 7a as shown by the arrows 18 into the settling compartment 7 where disengagement of the two fluid phases occurs under the influence of centrifugal force imparted by rotation of the rotor 2. One fluid phase (i.e. the heavier phase) passes through ports 10 (either into a further annular region) (not shown) or to means (not shown) for discharging the heavier fluid phase from the contactor. The second fluid phase (i.e. the lighter phase) passes downwardly out of the settling compartment 7 as shown by the light arrow 20 and through the port 11 as shown by arrows 14 into the annular region 4 wherein it is mixed with further first (heavy) fluid phase.

It can thus be seen that in operation the two fluid phases (i.e. the heavy fluid phase and the light fluid phase) move in a countercurrent flow.

In using a contactor in accordance with the present invention to effect liquid extraction the first and second fluid phases may comprise respectively a heavy (i.e. dense) liquid phase and a light (i.e. less dense) liquid phase.

In one application a contactor in accordance with the present invention may be used in liquid/liquid extracting process (e.g. those used in the nuclear industry) in which case one phase may be an organic phase and one phase is an aqueous phase.

Figure 2:
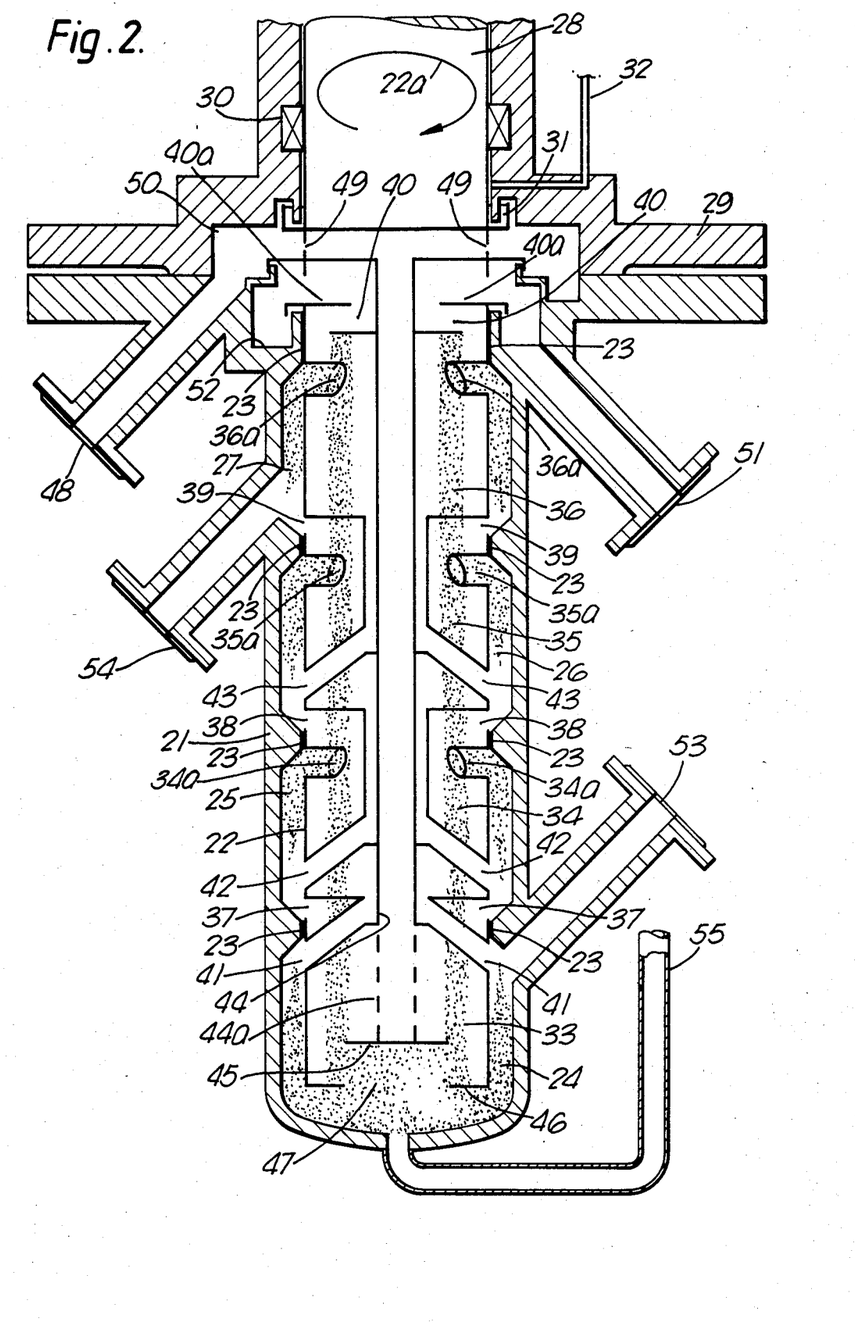
FIG. 2 is a diagrammatic representation of a contactor in accordance with the present invention.

Referring now to FIG. 2 of the drawings there is shown a diagrammatic representation of a contactor in accordance with the present invention. The contactor has a substantially circular cross-section stator 21 and a substantially circular cross-section rotor 22.

Rotating seals 23 are provided between the stator 21 and the rotor 22 and the stator 21 and the rotor 22 are so shaped as to define between them annular regions 24, 25, 26 and 27. It will be appreciated that the stator 21 provides a casing for containing the rotor 22.

The rotor 22 is connected to a rotatable shaft 28 supported in a housing 29 provided with bearing 30 and liquid seal 31 which in operation is fed with liquid through liquid seal inlet pipe 32.

The rotor 22 is provided with settling compartments 33, 34, 35 and 36 and with ports 34a, 35a, 36a, 37, 38, 39, 40, 41, 42 and 43.

The ports 34a, 35a and 36a, in operation, act as weir tubes and the length of 34a and 35a can be chosen to determine the position of the mixed first and second phases in the settling compartments 34 and 35 when the contactor is in operation. Weir 40a is provided the radial length thereof determing the position of the mixed first and second phases in settling compartment 36.

The rotor 22 is also provided with a centrally positioned duct 44 having a perforated tubular end portion 44a terminating in a baffle 45.

Portion 46 of the rotor 22 is provided with an aperture 47.

The duct 44 communicates with an outlet 48 via apertures 49 and annular chamber 50. Ports 40 communicate with an outlet 51 via annular chamber 52.

The stator 21 is also provided with an inlet 53 and inlet 54 and a drain line 55.

The operation of the contactor will now be described. In this description the first fluid phase is heavier (i.e. more dense) than the second fluid phase which, therefore, may be described as the lighter (i.e. less dense) phase.

In operation the rotor 22 is rotated within the stator 21, as indicated by the arrow 22a, and a first fluid phase is passed into the contactor through inlet 53 and a second fluid phase is introduced into the contactor through the inlet 54.

In view of the high shear conditions produced in annular region 24 by means of the relative rotation of the stator 21 and rotor 22 mixing of first and second fluid phases present in the region 24 occurs to give a mixture of fluid phases, comprising a mixture of the first and second phases, indicated by the dotted portion in the region 24. The mixture of fluid phases passes into the settling compartment 33, via the aperture 47 in the lower portion 46 of the stator 22, wherein disengagement of the first and second fluid phases occurs under the influence of the centrifugal force imparted by rotation of the rotor 21. One fluid phase (the heavier of the two fluid phases) passes through the ports 37 into annular region 25 and the other fluid phase (i.e. the lighter of the two fluid phases) passes into duct 44 via perforated tubular portion 44a and thence through the outlet 48 via ports 49 and chamber 50. The fluid phase which passes into annular region 25 (i.e. the heavier phase) is mixed with the fluid phase passing into the annular region 25 (i.e. the ligher phase) through the ports 42. The high shear conditions existing in the annular region 25 by the relative rotation of the stator 21 and rotor 22 produces a mixture of fluid phases as indicated by the dotted region in region 25.

The mixture fluid phases passes through ports 34a into the settling compartment 34 wherein disengagement of the two fluid phases occurs under the influence of the centrifugal force imparted by the rotation of rotor 22. One fluid phase (i.e. the heavier phase) passes through ports 38 into annular region 26 and the other fluid phase (i.e. the lighter fluid phase) passes out of the settling compartment 34 and through the ports 41 into the annular region 24 wherein it is mixed under the high shear condition therein with further first fluid phase introduced through the inlet 53 to form a mixture of fluid phases. The mixture of fluid phases passes into the settling compartment 33 and a sequence as disclosed in the immediately preceding paragraph occurs resulting in lighter phase passing into duct 44 and heavier phase passing into an annular region 25.

The heavier fluid phase which passes through ports 38 into annular region 26 is mixed with the fluid phase passing into the annular region 26 (i.e. the lighter phase) through ports 43. The high shear conditions existing in the annular region 26 produces a mixture of fluid phases as indicated by the dotted region in annular region 26.

The mixture of fluid phases passes through the ports 35a into the settling compartment 35 wherein disengagement of the two fluid phases occurs under the influence of the centrifugal force imparted by the rotation of rotor 22. One fluid phase (i.e. the heavier phase) passes through ports 39 into the annular region 27 and the other fluid phase (i.e. the lighter fluid phase) passes out of settling compartment 35 and through the ports 42 into the annular region 25 wherein it is mixed with first heavier phase which is supplied to the region 25 through ports 37. A mixture of fluid phases is formed and a sequence as hereinbefore described occurs resulting in lighter phase passing into region 24 through ports 41 and the heavier phase passing into annular region 26 via ports 38.

Heavier fluid phase which passes through ports 39 into the annular region 27 is mixed with the fluid phase passing into the annular region 27 (i.e. the lighter phase) through inlet 54. The high shear conditions existing in the region 27 produces a mixture of fluid phases as indicated by the dotted region in annular region 27.

The mixture of fluid phases passes through the ports 36a into the settling compartment 36 wherein disengagement of the two fluid phases occurs under the influence of the centrifugal force imparted by the rotation of the rotor 22. One fluid phase (i.e. the heavier fluid phase) passes through ports 40 and thence through the outlet 51 via annular chamber 52, and the other fluid phase (i.e. the lighter fluid phase) passes out of the settling compartment 36 and through the ports 43 into the annular region 26 wherein it is mixed with first heavier fluid phase supplied to the region 26 through ports 38. A mixture of fluid phases is formed under the high shear conditions existing in the region 26 and a sequence as hereinbefore described occurs resulting in the lighter phase passing into region 25 through ports 42 and the heavier phase passing into annular region 27 via ports 39.

It will be appreciated that, in operation, the heavier phase progresses from the inlet 53 to the outlet 51 in counter-current flow to the lighter phase which progresses from the inlet 54 to the outlet 48 by means of a "looping" route through the annular regions and the settling compartments.

It will be appreciated that the operation described above is after stable operation has been established following introduction of both phases to the contactor. At the beginning of operation one phase, preferably the heavy phase, may be introduced to fill the contactor and then a second phase added and operation continued until stable operation as described above is achieved.

In one application the contactor of FIG. 2 may be used in liquid/liquid extraction processes (e.g. such as those used in the nuclear industry) in which case one phase may be an aqueous phase and one phase may be an organic phase.

Figure 3:
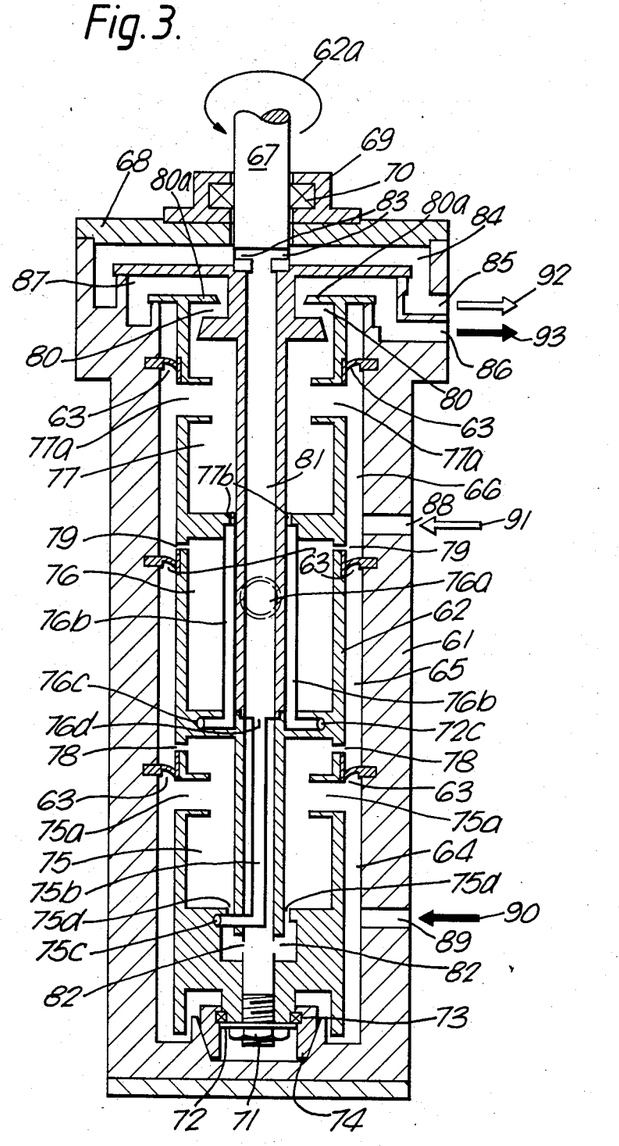
FIG. 3 is a diagrammatic representation of another contactor in accordance with the present invention.

Referring now to FIG. 3 of the drawings there is shown a diagrammatic representation of a contactor in accordance with the present invention. The contactor has a substantially circular cross-section stator 61 and a substantially circular cross-section rotor 62.

Rotating seals 63 are provided between the stator 61 and rotor 62 and the stator 61 and rotor 62 are so shaped as to define between them annular regions 64, 65 and 66. It will be appreciated that the stator 61 provides a casing for containing the rotor 62.

The rotor 62 is connected to a rotatable shaft 67 supported in a housing 68 having a bearing housing 69 and bearing 70. Also the rotor 62 is located in the stator 61 by means of nut 71 and flange 72 in contact with bearing 73 retained in housing 74.

The rotor 62 is provided with settling compartments 75, 76 and 77 and with ports 75a, 76a (of which only one of the two is visible in the Figure), 77a, 78, 79 and 80.

Also the rotor 62 is provided with a centrally positioned duct 81, having ports 82 at one end and ports 83 at the other end. The ports 83 communicate via chamber 84 with outlet 85.

The ports 75a, 76a and 77a act, in operation, as weir tubes and the length of 75a and 76a can be chosen to determine the position of mixed first and second phases in the separating compartments 75 and 76 when the contactor is in operation.

Ports 80 communicate with an outlet 86 through region 87.

Weir 80a is provided the radial length thereof determining the position of the mixed first and second phases in settling compartment 77.

Settling compartment 77 communicates with annular region 65 via apertures 77b, ducts 76b and ports 76c.

Settling compartment 76 communicates with annular region 64 by means of apertures 76d, ducts 75b and ports 75c. It will be appreciated that only one each of the two apertures 76d, two ducts 75b and two ports 75c can be seen in FIG. 3. Settling compartment 75 is in communication with ports 82 by means of apertures 75d.

The stator 61 also has inlet 88 and inlet 89.

Figure 3A:
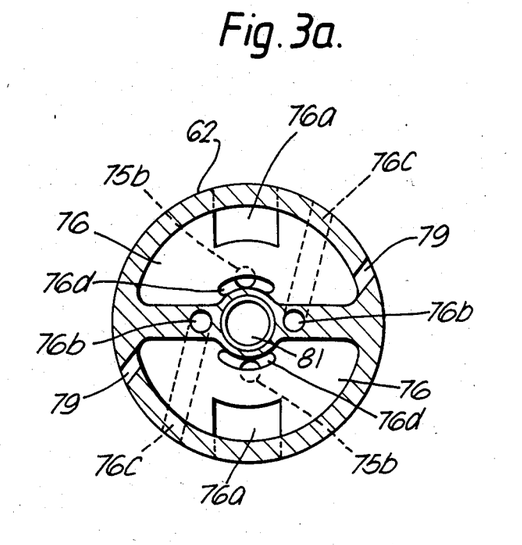
FIG. 3a is a diagrammatic representation of a part of the contactor shown in FIG. 3.

To assist further in the understanding of the construction of the contactor in accordance with FIG. 3 reference may be made to FIG. 3a. In FIG. 3a there is shown a diagrammatic view of a part of the rotor 62 as viewed looking along the axis of duct 81 from the end having ports 83 towards the end of the duct 81 having ports 82. It will be appreciated that other portions of the rotor 62 may be constructed in an essentially similar manner to the portion shown in FIG. 3a.

Referring to FIG. 3a there is shown a portion of rotor 62, part of duct 81 and settling compartment 76 with ports 76a which, when the rotor 62 is positioned within the stator 61, communicates settling region 76 with annular region 65. The ports 76a as stated above act, in operation, as weir tubes and the length thereof can be chosen to determine the position of mixed first and second phases in the settling compartment 76 when the contactor is in operation.

Also ports 79, are shown which, when the rotor 62 is in position in the stator 61, connect the settling region 76 with the said annular region 66.

When in position in the stator 61 ducts 76b connect the apertures 77b (FIG. 3) with the annular region 65 by means of ports 76c; additionally apertures 76d connect with ducts 75b which connect via ports 75c (FIG. 3) with the annular region 64 (FIG. 3).

The operation of contactor described with reference to FIG. 3 will now be described. In this description of the operation of the contactor the first fluid phase is heavier (i.e. more dense) than the second fluid phase which, therefore, may be described as the lighter (i.e. less dense) phase.

In operation the rotor 62 is rotated within the stator 61 as indicated by the arrow 62a, and a first fluid phase is passed into the contactor through inlet 89 as indicated by arrow 90 and a second fluid phase is introduced into the contactor through the inlet 88 as indicated by the arrow 91.

In view of the high shear conditions produced in annular region 64, by means of the relative rotation of the stator 61 and the rotor 62 mixing of first and second fluid phases present in the region 64 occurs to a mixture of fluid phases comprising a mixture of the first and second phases. The mixture of fluid phases passes through ports 75a into the settling compartment 75 wherein disengagement of the two fluid phases occurs under the influence of the centrifugal force imparted by the rotation of the rotor 62. One fluid phase (i.e. the heavier phase) passes through ports 78 into annular region 65 and the other fluid phase (i.e. the lighter fluid phase) passes into duct 81 by means of aperture 75d and ports 82 and then through the outlet 85 as indicated by arrow 92 via ports 83 and chamber 84. The fluid phase which passes into the annular region 65 (i.e. the heavier phase) is mixed with the fluid phase passing into the annular region 65 (i.e. the lighter phase) through the ports 76c. The high shear conditions existing in the annular region 65 by the relative rotation of the stator 61 and rotor 62 produces a mixing of fluid phases to give a mixture of fluid phases. The mixture of fluid phases passes through the ports 76a into the settling compartment 76 wherein disengagement of the two fluid phases occurs under the influence of the centrifugal force imparted by the rotation of rotor 62. One fluid phase (i.e. the heavier phase) passes through ports 79 into annular region 66 and the other fluid phase (i.e. the lighter fluid phase) passes out of the settling compartment 76 through apertures 76d and travels through duct 75b and enters by means of ports 75c the annular region 64 wherein it is mixed under the high shear conditions therein with further first fluid phase introduced through the inlet 89 to form a mixture of fluid phases. The mixture of fluid phases passes into the settling compartment 75 by means of the ports 75a and a sequence as described above occurs resulting in the lighter phase passing into duct 81 and the heavier phase passing into annular region 65.

The heavier fluid phase which passes through ports 79 into annular region 66 is mixed with the fluid phase passing into the annular region 66 through the inlet 88 as indicated by the arrow 91 (i.e. the lighter phase). The shear conditions existing in the annular region 66 produces a mixture of fluid phases which passes through the ports 77a into the settling compartment 77 wherein disengagement of the two fluid phases occurs under the influence of the centrifugal force imparted by the rotation of the rotor 62. One fluid phase (i.e. the heavier fluid phase) passes through ports 80 and thence through outlet 86 as indicated by arrow 93 via chamber 87, and the other fluid phase (i.e. the lighter fluid phase) passes out of the settling compartment 77 through apertures 77b ducts 76b and ports 76c into the annular region 65 wherein it is mixed with first heavier fluid phase which is supplied to the region 65 through ports 78. A mixture of fluid phases is formed and a sequence as hereinbefore discussed occurs resulting in the lighter phase passing into region 64 through apertures 76d ducts 75b and ports 75c and heavier phase passing into annular region 66 via ports 79.

It will be appreciated that, in operation, the heavier phase progresses from the inlet 89 to the outlet 86 in counter-current flow to the lighter phase which progresses from the inlet 88 to the outlet 85 by means of a "looping" route through the annular regions and settling compartments.

It will be appreciated that the operation described above is after stable operation has been established following introduction of both phases. At the beginning of the operation one phase, preferably the heavy phase, may be introduced to fill the contactor and then a second phase added until the stable operation, as described above, is achieved.

In one application the contactor of FIG. 3 may be used in liquid/liquid extraction processes (e.g. those used in the nuclear industry) in which case one phase may be an aqueous phase, one phase may be an organic phase.

Figure 4:
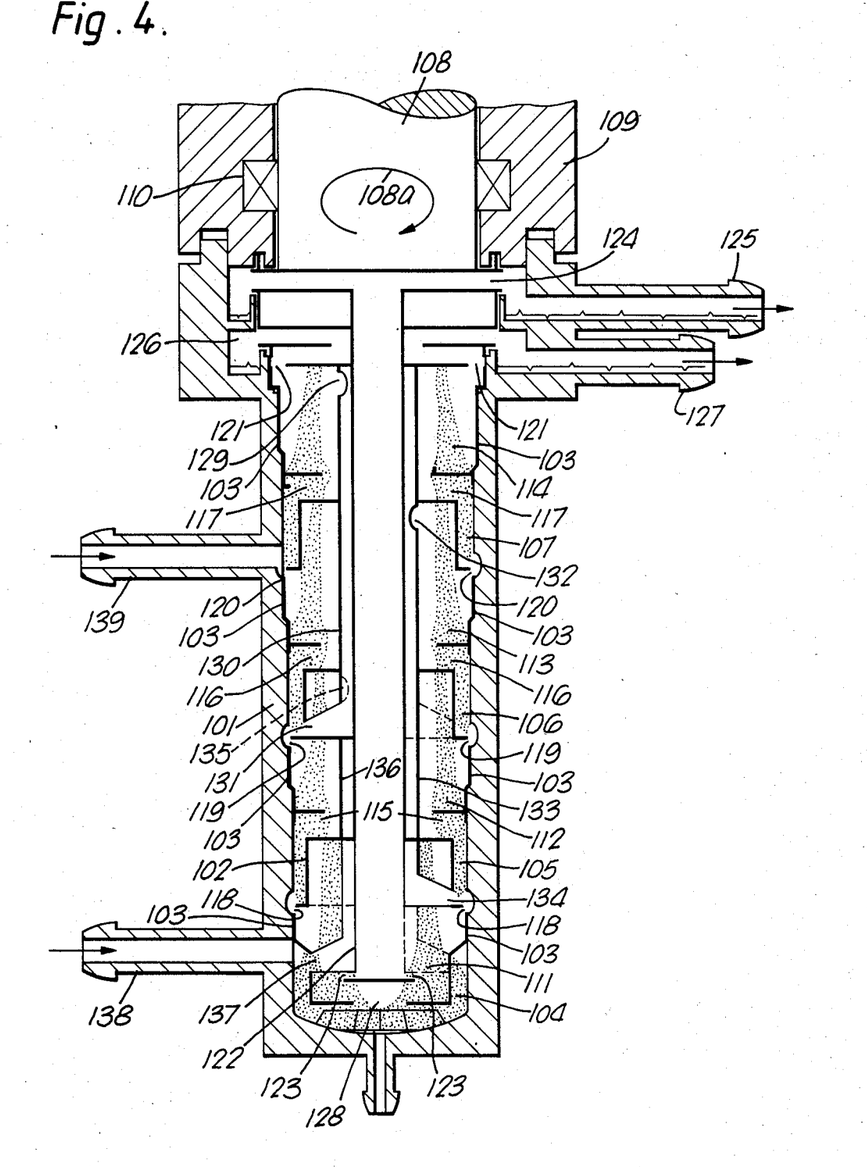
FIG. 4 is a diagrammatic representation of a further contactor in accordance with the present invention.

Referring now to FIG. 4 of the drawings there is shown a diagrammatic representation of a contactor in accordance with the present invention.

The contactor has a substantially circular cross-section stator 101 and a substantially circular cross-section rotor 102.

Rotating seals 103 are provided between the stator 101 and the rotor 102 and the stator 101 and the rotor 102 are so shaped as to define between them annular region 104, 105, 106 and 107. It will be appreciated that the stator 101 provides a casing for containing the rotor 102.

The rotor 101 is connected to a rotatable shaft 108 supported in a housing 109 having a bearing 110.

The rotor 102 is provided with settling compartments 111, 112, 113 and 114 and ports 115, 116, 117, 118, 119, 120 and 121.

Also the rotor 102 is provided with a centrally positioned duct 122 having ports 123 at one end and at the other end communicating via chamber 124 with outlet 125.

Ports 121 communicate through region 126 with outlet 127. The rotor 102 is also provided with an aperture 128.

Settling compartment 114 communicates with annular region 106 via aperture 129 duct 130 and port 131.

Settling compartment 113 communicates with annular region 105 via aperture 132 duct 133 and port 134.

Settling compartment 112 communicates with annular region 114 by means of aperture 135 duct 136 and port 137.

The stator 101 also has provided inlet 138 and inlet 139.

The operation of the contactor of FIG. 4 will now be described. In this description the first fluid phase is heavier (i.e. more dense) than the second phase which, therefore, may be described as the lighter (i.e. less dense) phase.

In operation rotor 102 is rotated within the stator 101 as indicated by the arrow 108a, and a first fluid phase is passed into the contactor through inlet 138 and a second fluid phase is introduced into the contactor through the inlet 139.

In view of the high shear conditions produced in annular region 104 by means of the relative rotation of the stator 101 and rotor 102 mixing of first and second phases present in the region 104 occurs to give a mixture of liquid phases, comprising a mixture of the first and second phases indicated by the dotted portion in the region 104. The mixture of fluid phases passes into the settling compartment through aperture 128 and in the settling compartment 111 disengagement of the first and second phases occurs under the influence of the centrifugal force imparted by the rotation of the rotor 101. One fluid phase (i.e. the heavier of two fluid phases) passes through the ports 118 into annular region 105. The other fluid phase (i.e. the lighter of two fluid phases) passes via ports 123 into duct 122 then into region 124 and subsequently leaves the contactor through the outlet 125. The fluid phase which passes into annular region 105 (i.e. the heavier phase) is mixed with the fluid phase passing into the annular region 105 (i.e. the lighter phase) through the port 134.

The high shear conditions existing in the annular region 105 by the relative motion of the stator 101 and rotor 102 produces a mixture of fluid phases as indicated by the dotted region in region 105.

The mixture of fluid phases passes through ports 115 into the settling compartment 112 wherein disengagement of the two fluid phases occurs under the influence of the centrifugal force imparted by the rotation of the rotor 102. One fluid phase (i.e. the heavier phase) passes through ports 119 into annular region 106 and the other fluid phase (i.e. the lighter fluid phase) passes out of the settling compartment 112 through aperture 135 duct 136 and port 137 into the annular region 104 wherein it is mixed under the high shear conditions therein with further first fluid phase introduced through the inlet as indicated by the arrow 140 to form a mixture of fluid phases.

The mixture of fluid phases passes into the settling compartment 111 and the sequence as described hereinbefore occurs resulting in the lighter phase passing into duct 122 and heavier phase passing into annular region 105.

The heavier fluid phase which passes through ports 119 into annular region 106 is mixed with the fluid phase passing into the annular region 106 (i.e. the lighter phase) through ports 131. The high shear conditions existing in the annular region 106 produces a mixture of fluid phases as indicated by the dotted region in annular region 106.

The mixture of fluid phases passes through the ports 116 into the settling compartment 113 wherein disengagement of the two fluid phases occurs under the influence of the centrifugal force imparted by the rotation of the rotor 102. One fluid phase (i.e. the heavier phase) passes through ports 120 into the annular region 107 and the other fluid phase (i.e. the lighter fluid phase) passes out of settling compartment 113 and through the aperture 132 duct 133 and ports 134 into annular region 105 wherein it is mixed with the first heavier phase which is supplied to the region 105 through ports 118. A mixture of fluid phases is formed and a sequence as hereinbefore described occurs resulting in the lighter phase passing into the annular region 104 and the heavier phase passing into annular region 106 via ports 119. Heavier fluid phase which passes through ports 120 into region 107 is mixed with the fluid phase passing into the annular region 107 (i.e. the lighter phase) through inlet 139.

The high shear conditions existing the region 107 produced a mixture of fluid phases as indicated by the dotted region in annular region 107. The mixture of fluid phases passes through the ports 117 into the settling compartment 114 wherein disengagement of the two fluid phases occurs under the influence of the centrifugal force imparted by the rotation of the rotor 102. One fluid phase (i.e. the heavier fluid phase) passes through ports 121 and thereafter through region 126 and through outlet 127, and the other fluid phase (i.e. the lighter fluid phase) passes out of the settling compartment 114 and through the aperture 129 duct 130 and aperture 131 into the annular region 106 wherein it is mixed with a first heavier fluid phase which is supplied to the region 106 through ports 119. A mixture of fluid phases forms and a sequence as described hereinbefore occurs resulting in the lighter phase passing into region 105 and the heavier phase passes into annular region 107.

It will be appreciated, that in operation, the heavier phase progresses from the inlet 138 to the outlet 127 in counter-current flow to the lighter phase which passes from the inlet 139 to the outlet 125 by means of a "looping" route through the annular regions and the settling compartments.

It will be appreciated that the operation described above is after stable operation has been established following introduction of both phases of the contactor.

At the beginning of start up of operation one phase, preferably the heavier phase, may be introduced to fill the contactor and then a second phase added until the stable operation as described hereinbefore is achieved. In one application a contactor of FIG. 4 may be used in liquid/liquid extraction processes (e.g. for example those used in nuclear industry) in which case one phase may be an aqueous phase and one phase may be an organic phase.

Figure 5:
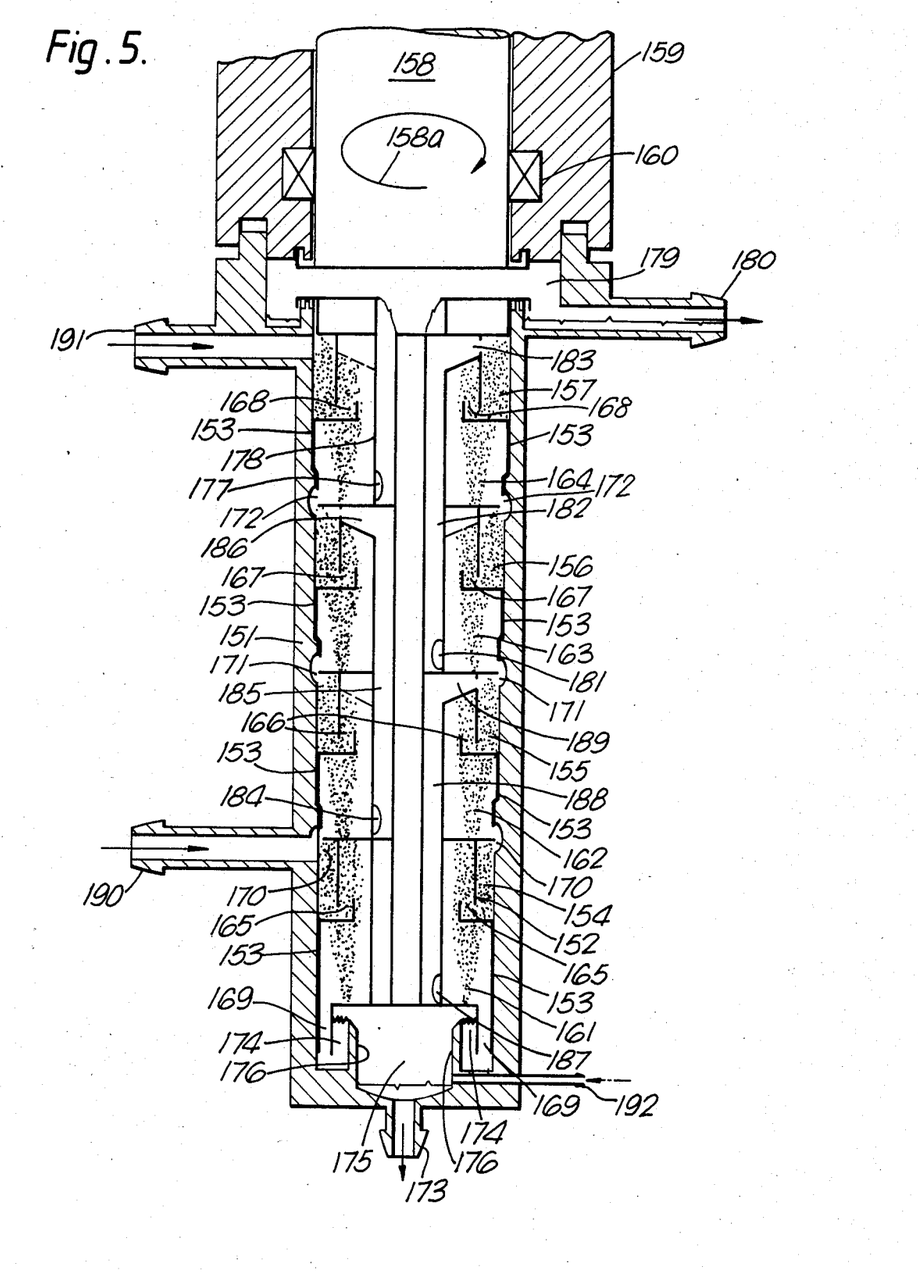
FIG. 5 is a diagrammatic representation of a further contactor in accordance with the present invention.

Referring now to FIG. 5 of the drawings there is shown a diagrammatic representation of a contactor in accordance with the present invention. The contactor has a substantially circular cross-section stator 151 and a substantially circular cross-section rotor 152.

Rotating seals 153 are provided between the stator 151 and the rotor 152 and the stator 151 and the rotor 152 are so shaped as to define between them annular regions 154, 155, 156 and 157. It will be appreciated that the stator 151 provides a casing for containing rotor 152.

The rotor 152 is connected to a rotatable shaft 158 supported in a housing 159 having a bearing 160. The rotor 152 is provided with settling compartments 161, 162, 163 and 164 and with ports 165, 166, 167 and 168. The rotor 152 is also provided with ports 169, 170, 171 and 172.

The ports 169 communicate with outlet 173 through aperture 174 and chamber 175 said chamber having walls 176.

Settling compartment 164 communicates via aperture 177, duct 178 and region 179 with outlet 180.

Settling region 163 communicates with annular region 157 via aperture 181, duct 182 and port 183.

Settling compartment 162 communicates with annular region 156 via aperture 184, duct 185 and port 186.

Settling compartment 161 communicates with annular region 155 via aperture 187, duct 188 and port 189.

Although in the Figure only one aperture 177 and duct 178 are shown two or more of each may be provided to connect settling compartment 164 with the region 179 and hence the outlet 180.

Similarly although only one aperture 187, duct 188 and port 189, one aperture 184, duct 185 and port 186, and one aperture 181, duct 182 and port 183 are shown more than one of each of the immediately preceding apertures, ducts and ports may be provided to connect respectively settling compartment 161 with annular region 155, settling compartment 162 with annular region 156 and settling compartment 163 with annular region 157.

The stator 151 is provided also with an inlet 190 and an inlet 191. There is also provided for the introduction of pressurizing gas into the stator 151 a pressurizing gas inlet 192.

The operation of the contactor described in relation to FIG. 5 will now be described. In this description the first fluid phase is heavier (i.e. more dense) than the second fluid phase which, therefore, may be described as the lighter (i.e. less dense) phase.

In operation the rotor 152 is rotated within the stator 121, as indicated by the arrow 158a and a first fluid phase is passed into the contactor through inlet 191 and a second fluid phase is introduced into the contactor through the inlet 190.

In view of the high shear conditions produced in annular region 154 by means of the relative rotation of the stator 151 and rotor 152 mixing of the first and second phases present in the annular region 154 occurs to give a mixture of fluid phases, comprising a mixture of the first and second phases indicated by the dotted portion in the region 154. The mixture of fluid phases passes into the settling compartment 161 via ports 165 wherein disengagement of the first and second phases occurs under the influence of the centrifugal force imparted by rotation of the rotor 151. One fluid phase (i.e. the heavier fluid phase) passes through the ports 169 and leaves the contactor via aperture 174, chamber 175 and outlet 173. The height of walls of 176 of chamber 175 can be chosen to produce a required level of liquid in the aperture 174 The walls 176 can act in the manner of a weir, which in combination with pressure of gas supplied at inlet 192 can maintain the desired hydrostatic conditions in the contactor.

The other fluid phase (i.e. the lighter of the two fluid phases) passes into duct 188 through aperture 187 and thereafter into annular region 155 via port 189.

The fluid phase which passes into the annular region 155 (i.e. the lighter phase) is mixed with the fluid phase passing into the annular region 155 via the ports 171 (i.e. the heavier phase). The high shear conditions existing in annular region 155 due to the relative rotation of the stator 151 and the rotor 152 produces a mixture of fluid phases as indicated by the dotted region in region 155.

The mixture of fluid phases passes through the ports 166 into the settling compartment 162 wherein disengagement of the phases occurs under the influence of the centrifugal force imparted by the rotation of rotor 152. One fluid phase (i.e. the heavier fluid phase) passes through ports 170 into the annular region 154 and the other fluid phase (i.e. the lighter fluid phase) passes out of the settling compartment 162 and through the aperture 184, duct 185 and port 186 into the annular region 156 wherein it is mixed under the high shear conditions therein with further first fluid phase passing into region 156 through ports 172 to form a mixture of fluid phases. The heavier fluid phase passing into annular region 154 through ports 170 is mixed with further lighter phase introduced to the contactor through inlet 190 and under the high shear conditions existing in the region 154, a mixture of fluid phases is formed and a sequence occurs as hereinbefore described which ultimately results in the heavier phase being discharged through the outlet 173 and the lighter phase passing via aperture 187, duct 188 and port 189 into the annular region 155.

Under the high shear conditions existing due to the relative rotation of the rotor 152 and the stator 151 a mixture of fluid phases is formed in annular region 156. This mixture passes via the ports 167 into the settling compartment 163 wherein disengagement of the phases occurs under the influence of the centrifugal force imparted by the rotation of the rotor 152. One fluid phase (i.e. the heavier fluid phase) passes through ports 171 into annular region 155 where it forms a mixture of phases with lighter phase being supplied to the region through port 189. A sequence as hereinbefore described then occurs with heavier fluid phase passing to annular region 154 and lighter fluid phase passing to region 156. The lighter phase leaving settling compartment 163 via aperture 181 and duct 182 passes into annular region 157 through port 183. The lighter phase is mixed in the said annular region 157 with heavier phase introduced through the inlet 191. A mixture of fluid phases is formed under the high shear conditions existing in annular region 157 by virtue of the relative rotation of the rotor 152 and the stator 151. The mixture of fluid phases passes through the port 168 into the settling compartment 164 where disengagement of the phases occurs under the influence of the centrifugal force imparted by the rotation of the rotor 152. One fluid phase (i.e. the heavier fluid phase) passes through the port 172 into the annular region 156 wherein under the high shear conditions therein it forms a mixture with lighter fluid phase introduced through the port 186. A sequence as hereinbefore described occurs with the result that heavier phase passes into the annular region 155 through the port 171 whilst lighter phase passes into the annular region 157 through port 183. Lighter phase leaves the settling compartment 164 through the aperture 177 and duct 178 passes into the region 179 and thereafter leaves the contactor through the outlet 180.

Pressurizing gas is applied during operation of the contactor through the pressurizing gas inlet 192 in order to maintain desired hydrostatic conditions in the contactor.

It will be appreciated, that in operation, the heavier phase progresses from the inlet 191 to the outlet 173 in counter-current flow to the lighter phase which passes from the inlet 190 to the outlet 180 by means of a "looping" route through the annular regions and the settling compartments.

It will be appreciated that the operation described above is after stable operation has been established following introduction of both of the phases to the contactor.

At the beginning of operation one phase, preferably the heavier phase, may be introduced to fill the contactor and then a second phase added until the stable operation as described is achieved. In one application the contactor of FIG. 5 may be used in liquid/liquid extraction processes (e.g. those used in the nuclear industry) in which case one phase may be an aqueous phase and one phase may be an organic phase.

Figure 5A:
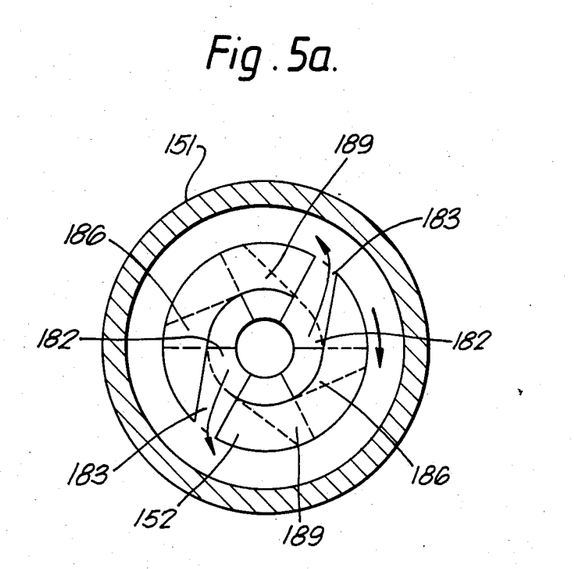
FIG. 5a is a diagrammatic representation of a part of the contactor shown in FIG. 5.

Referring now to FIG. 5a there is shown a partial diagrammatic cross-section, looking in the direction from chamber 179 to aperture 187, of the contactor of FIG. 5, in order to show further the construction of the rotor 152.

Thus, in FIG. 5a there is shown stator 151, rotor 152, ports 183, and the tops of the ducts 182. The dotted lines indicate the positions of ports 189 and 186 in other portions of the rotor 152.

Figure 6:
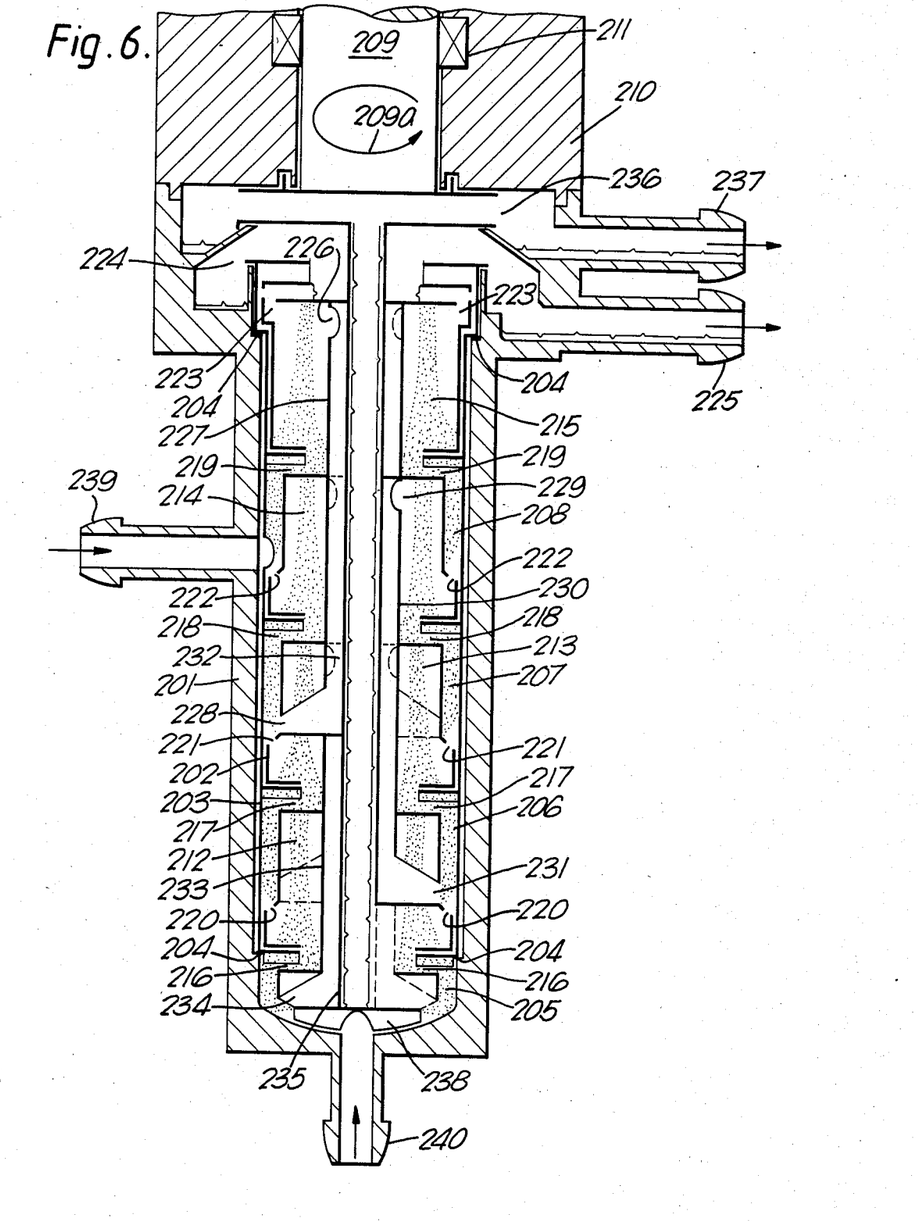
FIG. 6 is a diagrammatic representation of yet a further contactor in accordance with the present invention.

Referring now to FIG. 6 of the drawings there is shown a diagrammatic representation of a contactor in accordance with the present invention. The contactor has a substantially circular cross-section stator 201 and a substantially circular cross-section rotor 202. A liner 203 is positioned within the stator 201 and static seals 204 are provided between the liner 203 and stator 201. The rotor 202 and the stator 201 are so-shaped as to define between them annular region 205. The liner 203 and the rotor 202 are so-shaped as to define between them annular regions 206, 207 and 208.

It will be appreciated that the stator 201 provides a casing for the rotor 202 and liner 203.

The liner 203 may be made from thin sheet metal (e.g. stainless steel).

The rotor 202 is connected to a rotatable shaft 209 supported in a housing 210 having a bearing 211.

The rotor 202 is provided with settling compartments 212, 213, 214 and 215.

The rotor 202 and liner 203 are so-shaped as to define apertures 216, 217, 218 and 219 and the rotor 202 has ports 220, 221, 222 and 223. Ports 223 communicate via chamber 224 with outlet 225. Settling compartment 215 communicates with annular region 207 by means of apertures 226, ducts 227 and ports 228.

Settling region 214 communicates with annular region 206 by means of apertures 229, ducts 230 and ports 231.

Settling compartment 213 communicates with annular region 205 by means of apertures 232, ducts 233 and ports 234. Settling region 212 communicates through ports (not shown) with duct 235 which is centrally positioned and communicates via annular region 236 with outlet 237. The rotor 202 is provided with a flow distributor 238. The stator 201 is also provided with inlet 239 and 240.

The operation of the contactor will now be described. In this description the first fluid phase is heavier (i.e. more dense) than the second phase which, therefore, may be described as the lighter (that is less dense) phase.

In operation the rotor 202 is rotated within the stator 201 as indicated by the arrows 209a and a first fluid phase is passed into the contactor through inlet 240 and a second fluid phase is introduced into the contactor through the inlet 239.

In view of the high shear conditions produced in annular region 205 by means of the relative rotation of the stator 201 and rotor 202 mixing of first and second fluid phases present in the region 205 occurs to a mixture of fluid phases, comprising a mixture of the first and second phases indicated by the dotted portion in the region 205. The mixture of fluid phases passes into the settling compartment 212, via the aperture 216 defined by the liner 203 and rotor 202. In the settling compartment 212 disengagement of the first and second phases occurs under the influence of the centrifugal force imparted by rotation of the rotor 202. One fluid phase (i.e. the heavier of the two fluid phases) passes through the ports 220 into annular region 206 and the other fluid phase (the lighter of the two fluid phases) passes into duct 235 through ports (not shown) and thereafter through the outlet 237 by way of annular chamber 236. The fluid phase which passes into annular region 206 (i.e. the heavier phase) is mixed with the fluid phase passing into the annular region 206 (i.e. the lighter phase) through ports 231.

The high shear conditions existing in the annular region 206 by the relative rotation of the stator 201 and rotor 202 produces a mixture of fluid phases as indicated by the dotted region in region 206.

The mixture of fluid phases passes into settling compartment 213 through aperture 217 defined between the rotor 202 and the liner 203. In the settling compartment 213 disengagement of the two fluid phases occurs under the influence of the centrifugal force imparted by the rotation of rotor 202. One fluid phase (i.e. the heavier phase) passes through ports 221 into annular region 207 and the other fluid phase (i.e. the lighter fluid phase) passes through ports 232, ducts 233 and ports 234 into annular region 205 wherein it is mixed under the high shear conditions therein with further first fluid introduced through the inlet 240 to form a mixture of fluid phases.

The mixture of fluid phases passes into the settling compartment 212 and a sequence as described above occurs resulting in the lighter phase passing into duct 235 and heavier phase passing into the annular region 206.

The heavier phase which passes through ports 221 into the annular region 207 is mixed with the fluid phase passing into the annular region 207 (that is lighter phase) through ports 228. The high shear conditions existing in the annular region 207 produces a mixture of fluid phases as indicated by the dotted region in the annular region 207.

The mixture of fluid phases passes through the apertures 218 into settling compartment 214 wherein disengagement of the two phases occurs under the influence of the centrifugal force imparted by the rotation of the rotor 202. One fluid phase (that is the heavier phase) passes through ports 222 into annular region 208 and the other fluid phase (that is to say the lighter fluid phase) passes out of settling compartment 214 through apertures 229, ducts 230 and ports 231 into annular region 206 wherein it is mixed with first heavier phase which is supplied to the region 206 by means of the ports 220. A mixture of fluid phases is formed and a sequence as hereinbefore described occurs resulting in the lighter phases passing into region 205 and the heavier phase passing into annular region 207.

Heavier fluid phase which passes through ports 222 into the annular region 208 is mixed with the fluid phase passing into the annular region 208 (i.e. the lighter phase) through inlet 239.

The high shear conditions existing in the region 208 produces a mixture of fluid phases as indicated by the dotted region in the said annular region 208.

The mixture of fluid phases passes through apertures 219 into the settling compartment 215 wherein disengagement of the two fluid phases occurs under the influence of the centrifugal force imparted by the rotation of the rotor 202. One fluid phase (i.e. the heavier fluid phase) passes through ports 223 and thereafter via region 224 and out of the contactor through outlet 225, and the other fluid phase (i.e. the lighter fluid phase) passes out of the settling compartment 215 through apertures 226, ducts 227 and ports 221 into annular region 207 wherein it is mixed with first heavier fluid phase which is supplied to said region 207 through ports 221. A mixture of fluid phases is formed and a sequence as hereinbefore described occurs resulting in the lighter phase passing into region 206 and the heavier phase passing into annular region 208.

It will be appreciated that, in operation, the heavier phase progresses from the inlet 240 to the outlet 225 in a counter-current flow to the lighter phase which progresses from the inlet 239 to the outlet 237 by means of a "looping" route through the annular regions and the settling compartments.

It will be appreciated that the operation described above is after stable operation has been established following addition of both phases to the contactor. At the beginning of operation one phase may be introduced to fill the contactor and then a second phase added until the stable operation as described above is achieved.

In one application the contactor of FIG. 6 may be used in liquid/liquid extraction processes (e.g. those used in the nuclear industry) in which case one phase may be an aqueous phase and one phase may be an organic phase.

I claim:

1. A centrifugal contactor comprising: a stator; a rotor mounted for rotation within the stator; means for rotating the rotor within the stator; a plurality of annular mixing regions positioned sequentially along the axis of rotation of the rotor, each of said annular mixing regions being located between the rotor and stator; a plurality of annular centrifugal settling compartments carried by the rotor for rotation therewith and disposed sequentially along the axis of rotation of said rotor; said annular mixing regions and said annular centrifugal settling compartments together forming a plurality of centrifugal contactor stages disposed sequentially along the axis of rotation of said rotor, means for introducing a first liquid into an annular mixing region of said centrifugal contactor; means for introducing a second liquid into an annular mixing region of said centrifugal contactor; means carried by said rotor for rotation therewith for transferring mixed liquid from an annular mixing region to an associated centrifugal settling compartment in each respective stage; means carried by said rotor for rotation therewith for transferring a first liquid from a centrifugal settling compartment of a stage to a mixing region of an adjacent stage; means carried by said rotor for rotation therewith for transferring a second liquid from a centrifugal settling compartment of a stage to a mixing region of an adjacent stage; whereby, in operation, first and second liquids introduced into said centrifugal contactor flow sequentially through said stages, are admixed in each of said mixing regions, and are separated in each of said centrifugal settling compartments; outlet means for withdrawing the first liquid from a centrifugal settling compartment after it passes sequentially through said stages; outlet means for withdrawing the second liquid from a centrifugal settling compartment after it passes sequentially through said stages; said rotor, said annular centrifugal settling compartments carried by said rotor, and said transferring means carried by said rotor being constructed such that they are removable as a unit from said stator.

2. A centrifugal contactor according to claim 1 wherein the first liquid introducing means comprises means for introducing the first liquid into the annular mixing region of a first stage of said contactor, wherein the second liquid introducing means comprises means for introducing the second liquid into the annular mixing region of the last stage of said contactor, said first and second stages being located at one end of said contactor and said last stage being located at the other end of said contactor such that the first liquid flows through said stages before reaching said last stage and the second liquid flows through said stages from said last stage before reaching said first stage, wherein the first liquid outlet means comprises outlet means for withdrawing the first liquid from the last stage of said contactor, and wherein the second liquid outlet means comprises outlet means for withdrawing said second liquid from the first stage of said contactor, wherein, in operation, said first and second liquids pass countercurrently through said contactor.

3. A centrifugal contactor according to claim 1 further comprising rotating seal means between the rotor and stator for sealing adjacent mixing regions from one another.

4. A centrifugal contactor according to claim 1 wherein said stator is provided with a liner so shaped as to define in combination with said rotor said plurality of annular mixing regions.

* * * * *